United States Patent [19]

McGregor et al.

[11] Patent Number: 4,966,932

[45] Date of Patent: Oct. 30, 1990

[54] ULTRA-HIGH SOLIDS THEIC POLYESTER ENAMELS

[76] Inventors: Charles W. McGregor, 6934 Sweetbrier Dr., Fort Wayne, Ind. 46804; James J. Connell, 8809 Lima Rd., Fort Wayne, Ind. 46818

[21] Appl. No.: 102,963

[22] Filed: Sep. 30, 1987

[51] Int. Cl.$^5$ ............................................. C08L 00/00
[52] U.S. Cl. .................... 524/245; 524/539; 524/590; 524/602; 528/289
[58] Field of Search ............... 524/602, 245, 539, 590; 528/289

[56] References Cited

U.S. PATENT DOCUMENTS 4,476,279 10/1984 McGregor .......................... 528/289

*Primary Examiner*—C. Warren Ivy

[57] ABSTRACT

An ultra-high solids content, organic solvent solution of polyester magnet wire enamel is described. The enamel is a tris (2-hydroxy-ethyl) isocyanurate polyester having a ratio of hydroxyl to carboxyl groups of 1.65 to 2.0:1 and a hydroxyl number of 216 to 316. Such enamels are produced with solids contents of greater than 70% by weight and viscosity less than 3,000 cps at 160° C. The method of making such enamel by reacting a glycol, tris (2-hydroxy-ethyl) isocyanurate, and an aromatic diacid or diester, reacting this polymer with modifying phenolic and polyisocyanate and adding an aromatic titanate catalyst is also described.

19 Claims, 1 Drawing Sheet

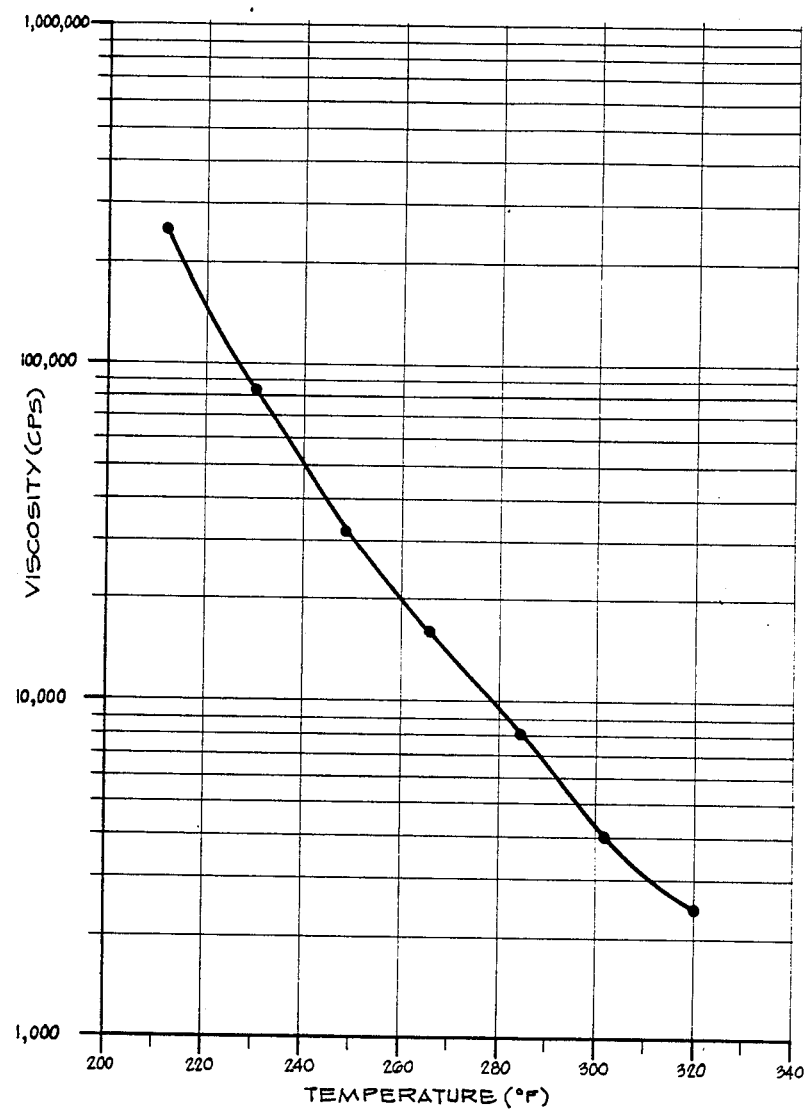

ULTRA-HIGH SOLIDS THEIC POLYESTER ENAMELS

DESCRIPTION

1. Technical Field

The field of art to which this invention pertains is polyester polymers, and specifically polyester magnet wire enamels.

2. Background Art

Highly cross-linked polyester polymer systems in which tris (2-hydroxy-ethyl) isocyanurate (hereinafter referred to as THEIC) is the tri-functional alcohol have been successfully used as magnet wire coatings for some time. Note U.S. Pat. Nos. 3,342,780 and 3,249,578. Coating enamels made from these polymers are typically low in solids content (for example about 25% to about 40% by weight) and high in organic solvent content (for example 60% to 75% by weight). The application of these enamels requires considerable energy expenditure to remove the large amounts of the typically high boiling organic solvents used to apply these enamels to magnet wire. In addition, the solvents themselves are expensive and cannot be economically reclaimed in the enamelling process.

More recently, there has been increased success in producing high solids content, low viscosity organic solvent solutions of magnet wire enamels in the THEIC polyester area. Note commonly assigned U.S. Pat. No. 4,476,279, the disclosure of which is incorporated by reference. However, with improved magnet wire coating application methods in which both the enamel and the magnet wire to be coated can be heated to temperatures as high as 160° C. (320° F.), even higher solids content enamels are being sought out that are stable at the desired elevated application temperatures.

Accordingly, what is needed in this art is an extension of the THEIC polyester polymer systems that can be made into even higher solids content enamels with relatively low organic solvent content which can be applied to an enamelling process at elevated temperatures to produce a smooth coating that has all of the desirable magnet wire insulating properties.

Disclosure of Invention

The present invention is directed to an ultra-high solids content (greater than 70%) polyester magnet wire enamel that has the thermal stability to be heated to temperatures as high as 160° C. (320° F.) for application to wire.

The polyester is prepared by reacting a glycol, THEIC, and an aromatic diacid or diester, in the presence of an esterification catalyst with about 24 to about 50 equivalent percent diol, about 17 to about 38 equivalent percent triol, and about 33% to about 38% diacid or diester.

The polyester enamel synthesis is unique in that the phenolic and blocked isocyanate modifying resins are reacted with the polyester. The polyester polymer synthesis is carried out in the presence of esterification catalysts such as titanates when an aromatic acid ester such as dimethylterephthalate is used as the difunctional acid component and litharge (PbO) when an aromatic acid such as terephthalic acid is used. Upon completion of the polyester synthesis, modifying phenolic and blocked isocyanate resins are reacted with the polyester polymer at relatively high temperature (190° C.–220° C., preferably 210° C.). The aromatic titanate catalyst required for proper cure of the modified polyester enamel on wire is added at temperatures as high as 160° C. The use of the aromatic titanate catalyst is important for it allows the ultra high solids THEIC polyester enamels to remain stable in the enamel form at temperatures up to 160° C. (320° F.) so that enamel application temperatures up to 160° C. can be used to obtain proper enamel application viscosity. The aromatic titanate catalyst also promotes proper transesterification cure on wire at temperatures above about 200° C.

Another aspect of the invention is a method of coating an electrical conductor with such enamel by applying the enamel and heating and curing the coated wire.

The foregoing, and other features and advantages of the present invention, will become more apparent from the following description.

BRIEF DESCRIPTION OF DRAWING

The FIGURE shows viscosity versus temperature of typical enamels according to the present invention.

BEST MODE FOR CARRYING OUT THE INVENTION

The principal reactants in the formulation of the magnet wire enamel according to the present invention are the THEIC, a diol, and an aromatic diacid or diester. The materials are reacted in the presence of an esterification catalyst.

Representative diols which can be used in the present invention are represented by the formula HO-R-OH where R can be aliphatic, aromatic, cyclic, unsaturated aliphatic, etc. Typical glycols used are:

| | |
|---|---|
| HO—CH$_2$—CH$_2$—OH | ethylene glycol |
| HO—CH$_2$—CH$_2$—CH$_2$—OH | propylene glycol |
| HO—CH$_2$—CH$_2$—CH$_2$—CH$_2$—OH | butyl glycol |
| CH$_3$—CH(OH)—CH$_2$—CH$_2$—OH | 1, 3 butyl glycol |
| CH$_3$—CH$_2$—CH(OH)—CH$_2$—OH | 1, 2 butyl glycol |
| HO—CH$_2$—CH$_2$—O—CH$_2$—CH$_2$—OH | diethylene glycol |
| HO—CH$_2$—CH$_2$—O—CH$_2$—CH$_2$—O—CH$_2$—CH$_2$—OH | triethylene glycol |

The preferred diols are the glycols and particularly ethylene glycol with a molecular weight of 62 and an equivalent weight of 31.

The THEIC used has a molecular weight of 261 and an equivalent weight of 87, with the following formula:

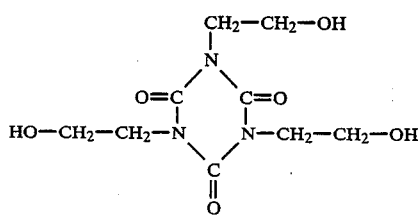

The acid component is a difunctional aromatic acid or aromatic acid ester having the formula:

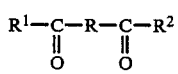

where R is an aromatic group and $R^1$ and $R^2$ are the same or different and selected from the group —OH, —O—$R^3$ (where $R^3$ is aliphatic and typically methyl or ethyl). Typical acid components are:

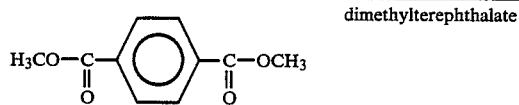
dimethylterephthalate

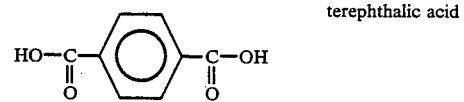
terephthalic acid

isophthalic acid

The synthesis is carried out in the presence of an esterification catalyst such as titanates, e.g. tetrabutyltitanate or tetracresyltitanate.

The use of the aromatic titanate introduced with solvent after the initial synthesis stage (note the Example) is important for ease of application of the polymer to wire and in obtaining magnet wire properties of the polymer on wire, e.g. because of the delayed cross-linking it provides (e.g. over nonaromatic titanates).

Generally about 24% to about 50% of the diol (preferably about 28% to about 33%), about 17% to about 38% of the triol (about 30% to about 35% preferred) and about 33% to about 46% of the diacid or diester (about 35% to about 38% preferred) (equivalent percent) are reacted in the presence of the titanate catalyst. During and after reaction, conventional organic solvents (e.g. cresylic acid, phenols and xylenols) may be added. Modifying additives, phenolic (a condensation product of formaldehyde and phenols or cresols) and conventional blocked polyisocyanates (e.g. Mondur S, Mondur SH, Mobay Chemical Co.), are reacted with the polyester polymer at relatively high temperature (210° C., 410° F.) in the enamel form. An aromatic cresyl titanate catalyst is added to the enamel at temperatures as high as 160° C. This catalyst gives the enamel stability up to application temperatures of 160° C. (320° F.) allowing the ultra-high solids enamel viscosity to be adjusted with temperature. The same catalyst promotes proper transesterification cure of the enamel on wire at temperatures above 200° C. (392° F.). A flow control agent may also be added to the enamel to enhance the ease of application. The modifying phenolics are typically added at about 3% to about 6%, and preferably about 4.5%, the polyisocyanates at about 2.5% to about 5.8% and typically about 4.1%, and the additional esterification catalyst at about 3% to about 9% and typically about 6%, all percents by weight based on amount of synthesized polyester polymer. Mondur® SH from Mobay with a molecular weight of 804 and an equivalent weight of 268 is particularly preferred. It has the following formula:

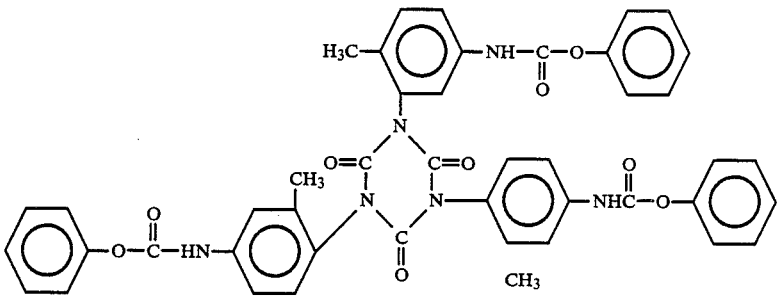

As the modifying phenolic, reaction products of para and meta cresols with formaldehyde are particularly preferred having molecular weights of 138 and the following formulas:

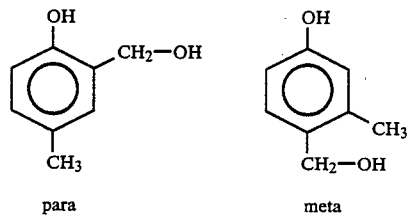

para      meta

Tetronic® R Polyol available from BASF-Wyandotte is the particularly preferred flow control agent. Note commonly assigned U.S. Pat. No. 4,447,472, the disclosure of which is incorporated by reference.

EXAMPLE

Example

| Part | Material | Equivalents | % By Weight |
|---|---|---|---|
| 1 | Ethylene glycol (E.G.) | 12 | 9.80 |
|  | THEIC | 14.4 | 33.03 |
|  | Dimethylterephthalate | 16 | 40.91 |

Example-continued

| Part | Material | Equivalents | % By Weight |
|---|---|---|---|
| | (DMT) | | |
| 2 | Tetracresyltitanate (TCT) (85% in cresylic acid) | — | 0.16 |
| 3 | 40% Phenolic | — | 7.88 |
| 4 | Mondur ® SH | — | 2.87 |
| 5 | TCT (85% in cresylic acid) | — | 5.27 |
| 6 | Tetronic 130R2 | — | 0.08 |
| | | | 100.00 |
| | Reaction by-product | | −13.50 |
| | Yield | | 86.50 |

Final Specifications

Solids Content: Theoretical Solids=93.5%, measured solids content (0.700 g, ½ hr at 200° C.)=88.4%
Brookfield Viscosity: 251,000 cps at 100° C. 16,050 cps at 130° C. 2,485 cps at 160° C.
OH/COOH
Equivalent Ratio: 1.65:1.0

PREPARATION

Parts one and two are heated and reacted under an inert atmosphere up to 220° C. over an eight hour period. The reaction temperature is held at 220° C. until all the methanol reaction by-product is removed. The polymerization stops at a molecular weight distribution that gives a Gardner-Holdt viscosity at 30° C. of I to J when 4.5 grams of resin are dissolved in 10.5 grams of cresylic acid. The mixture is then cooled to 210° C. and part three is added with mixing. The resultant is held at 210° C. for one hour. After Part 3 is added and held at 210° C. for one hour. Part 4 is added and held at 210° C. for one hour. During the addition of parts 3 and 4, a reaction between the polyester and each of the phenolic of part 3 and the polyisocyanate or part 4 takes place. The resulting resultant is then cooled to 150° C. and Part 5 is mixed in followed by Part 6. The final reaction product can be further reduced in solids content by the addition of solvent or filtered at 140° C. at a theoretical solids content of 93.5% and a measured solids content of 88.4%.

The resulting polyester enamel was applied to 18 AWG copper wire in multiple passes with a standard polyamide (e.g. nylon 6,6) as a topcoat (note: the polyester enamel was reduced to 40% solids with conventional solvents to test wire properties since only conventional coating apparatus was available for testing). The basecoat to topcoat ratios of the total enamel build on the wire were 75-80:25-20. The enamels were cured by passing the wire through a standard 20 foot gas fired oven with bottom and top zone temperatures of 660° F. and 855° F. respectively. The resulting magnet wire properties were as follows:

| Sample | 1 | 2 | 3 |
|---|---|---|---|
| Tg (glass transition) temperature Cure °K. | 426° | 421.5° | 418.5° |
| DF (Dissipation Factor) 250° C. | 0.13 | 0.18 | 0.26 |
| Smoothness | Good | Good | Good |
| Build (mils) | 3.0 | 3.0 | 3.0 |
| Flexibility (Snap + X) | Pass 1X | Pass 1X | Pass 1X |
| Heat Shock | Pass | Pass | Pass |
| 20% + 3X 200° C. | | | |

While the polymers according to the present invention can be used on any electrical conductor, they are preferably used on wires and specifically magnet wires. The wires are generally copper or aluminum. Wires ranging anywhere from 4 AWG to 46 AWG may be coated with an enamel made of this polymer system, however to utilize the enamel in the ultra-high solids content form (>70%) wires from 4 AWG to 24 AWG are preferred due to the necessary enamel and wire application temperatures (up to 160° C., 320° F.). The most commonly coated wire size being 18 AWG. Wire coatings can be anywhere from 0.2-5.0 mils or any thickness desired and preferably about 3.0 to 3.2 mils on 18 AWG wire. The enamel can be applied in a number of coatings of equal thickness with curing between coats. The preferred number of coatings for the ultra high solids enamel (>70%) is two to five coats. The coatings can be used as a sole insulation coat or part of a multicoat system in combination with other conventional polymer insulation, such as other polyesters, polyamides, polyamideimides, polyesterimides, etc., and combinations thereof. The polymer coatings of the present invention can also contain lubricants either externally on the coating, internally in the coating, or both.

The enamels made according to the present invention can be applied by any standard means such as coating dies, roller, or felt application, with viscosity adjustments made accordingly. Viscosity adjustments can be made by adjusting the temperature of the enamel (see the Figure) or by dilution with appropriate enamel solvents, or diluents for any coating method. However to use the ultra high solids content enamel (greater than 70%), a relatively small amount of solvent is used (less than 30% by weight) and elevated temperature up to 160° C. (320° F.) is used for viscosity ajustment. As the enamel solvents, any conventional enamel solvents such as cresylic acid, phenols or xylenols can be used.

Conventional magnet wire production ovens can be used to cure the coated magnet wire. Inlet oven temperatures of the order of about 600°-900° F. (315° C.-482° C.), preferably about 750° F. (399° C.) and outlet oven temperature of about 800°-1100° F. (427°-593° C.), and preferably about 950° F. (510° C.) are typically used for drying and curing. In order to apply the enamel to wire in the ultra high solid content form (>70%), it is necessary to have both the enamel in the applicator and the incoming wire to be coated at a sufficiently high temperature to obtain the desirable enamel application viscosity (see the FIGURE). This can be accomplished by preheating the wire in a chamber separate from the curing ovens, in the curing ovens, or using other preheating sources, e.g. resistance heaters.

While this invention has been described in terms of magnet wire insulation, this invention includes the use of this material as a free standing film, e.g. for such uses as phase insulation, coil wrapping, etc., and as varnishes for uses other than magnet wire insulation.

As discussed above, in addition to the cost saving advantages of employing enamels according to the present invention, this unique stoichiometry also provides for a better product by virtue of better control of the reaction during synthesis (less tendency to gel). As compared to conventionally prepared polyester enamels the controlled molecular weight distribution resulting from the 1.65 to 2.0:1 hydroxyl to carboxyl stoichiometry provides improved polymer solubility and results in smoother solvent (and diluent) removal during drying and curing of the enamel since there is less tendency for trapping of solvent resulting in smoother coatings with less tendency to blister or form beads. Furthermore, using less solvent per application because of higher solids results in less solvent being removed in the bake cycle and therefore less polluting effects.

The finished enamel can be produced at greater than 70% solids (e.g. 71% to 85% measured solids content), preferably greater than 85% solids, and most preferably at greater than 90% solids content and because of the enamel stability at elevated temperatures (as high as 160° C., 320° F.) it may be heated to result in a viscosity range that is easily handled during enamel production and final application. The resulting enamel cures on wire to give all of the desirable magnet wire properties of a lower solids content THEIC polyester and requires significantly less energy for the application cure.

Although this invention has been shown and described with respect to detailed embodiments thereof, it will be understood by those skilled in the art that various changes in form and detail thereof may be made without departing from the spirit and scope of the claimed invention.

We claim:

1. A magnet wire enamel comprising a greater than 70% by weight solids, organic solvent solution of the reaction product at about 190° C. to about 220° C. of:
    a tris(2-hydroxy-ethyl)isocyanurate polyester having a ratio of hydroxyl to carboxyl groups of 1.65 to 2.0:1 and a hydroxyl number of 216 to 316;
    a modifying phenolic which is the reaction product of formaldehyde with phenol or cresols; and
    a blocked polyisocyanate.

2. The enamel of claim 11 wherein the ratio of hydroxyl to carboxyl groups is about 1.8 to 1 and the hydroxyl number is 250 to 270.

3. The enamel of claim 1 wherein the solids content is greater than 85% by weight.

4. The enamel of claim 1 wherein the solids content is greater than 90% by weight.

5. The enamel of claim 1 wherein the viscosity is less than 3,000 cps at 160° C.

6. The enamel of claim 1 wherein about 3% to about 6% of said modifying phenolic, about 2.5% to about 5.8% of said blocked polyisocyanate are reacted with said polyester in the presence of about 3% to about 9% of an esterification catalyst, all percents being weight percent based on amount of polyester.

7. The enamel of claim 1 further comprising up to 0.1% by weight of a polyol flow control agent.

8. The enamel of claim 1 having thermal stability at temperatures up to 160° C.

9. The enamel of claim 1 having cure temperatures above 200° C.

10. A method of making a magnet wire enamel comprising an organic solvent solution having solids content greater than 70% by weight comprising reacting at about 190° C. to about 220° C.:
    a polyester comprising the reaction product of about 17 to about 38 equivalent percent of tris(2-hydroxy-ethyl)isocyanurate,
    about 24 to about 50 equivalent percent of a diol and
    about 33 to about 46 equivalent percent aromatic diacid or aromatic diester, in the presence of an esterfication catalyst to produce a polyester having a ratio of hydroxyl to carboxyl groups of 1.65 to 2.0:1 and a hydroxyl number of 216 to 316;
    about 3% to about 9% of modifying phenolic which is the reaction product of formaldehyde with phenol or cresols; and
    about 2.5 to about 5% blocked polyisocyanate; and subsequently
    admixing at up to about 160° C. about 3% to about 6% aromatic titanate catalyst; the percentages of said modifying phenolic, said blocked polyisocyanate and said aromatic titanate catalyst are by weight based upon the polyester.

11. The method of claim 10 wherein the solids content of the enamel is greater than 85% by weight.

12. The method of claim 10 wherein the solids content of the enamel is greater than 90% by weight.

13. A method of making an ultra high solids polymer for use as a magnet wire enamel comprising the steps of:
    reacting, in equivalent percent, a mixture of about 17% to about 38% tris (2-hydroxy-ethyl) isocyanurate about 24% to about 50% of a diol and about 33% to about 46% aromatic diacid or aromatic diester in the presence of an esterification catalyst under an inert atmosphere up to 220° C.;
    thereafter maintaining the reaction temperature at about 220° C. until all the internal reaction by-product is removed;
    thereafter cooling the resultant polyester to about 210° C.
    thereafter adding and reacting at about 210° C. for about 1 hour about 3% to about 9% phenolic modifier which is a condensation product of formaldehyde and phenol or cresols with said polyester;
    thereafter adding and reacting at about 210° C. for about 1 hour 2.5 to about 5.8% blocked polyisocyanate with the product from the phenolic modifier step;
    thereafter cooling the product from the blocked polyisocyanate reaction to about 160° C.; and
    thereafter adding about 3% to about 9% aromatic esterification catalyst thereto so that the resultant enamel is greater than 70% solids,
    with all percent of the phenolic modifier, blocked polyisocyanate and esterfication catalyst being weight percent based upon the amount of the resultant polyester.

14. The method of claim 13 wherein the first esterification catalyst is tetra cresyl titanate or tetra butyl titanate and the aromatic esterification catalyst is tetra cresyl titanate.

15. A magnet wire enamel produced in accordance with the method of claim 13.

16. A magnet wire enamel produced in accordance with the method of claim 14.

17. A magnet wire enamel produced in accordance with the method of claim 10.

18. The enamel of claim 6 wherein said esterification catalyst comprises an aromatic titanate.

19. The method of claim 13 wherein the order of adding and reacting the phenolic modifier and the polyisocyanate is reversed.

* * * * *